United States Patent
Petker et al.

(10) Patent No.: US 11,710,419 B2
(45) Date of Patent: *Jul. 25, 2023

(54) SYSTEM AND METHOD FOR GATING NOTIFICATIONS

(71) Applicant: D2L Corporation, Kitchener (CA)

(72) Inventors: Daniel Petker, Waterloo (CA); Jeffrey Geurts, Kitchener (CA); Ryan Ische, Stratford (CA); Jeffrey Avis, Kitchener (CA); Jeffrey Ashton, Kitchener (CA)

(73) Assignee: D2L Corporation, Kitchener (CA)

( * ) Notice: Subject to any disclaimer, the term of this patent is extended or adjusted under 35 U.S.C. 154(b) by 0 days.

This patent is subject to a terminal disclaimer.

(21) Appl. No.: 17/521,030

(22) Filed: Nov. 8, 2021

(65) Prior Publication Data

US 2022/0139244 A1 May 5, 2022

Related U.S. Application Data

(63) Continuation of application No. 16/111,383, filed on Aug. 24, 2018, now Pat. No. 11,195,427, which is a continuation of application No. 15/644,258, filed on Jul. 7, 2017, now Pat. No. 10,074,287, which is a continuation of application No. 14/954,684, filed on Nov. 30, 2015, now Pat. No. 9,721,477, which is a continuation of application No. 13/665,410, filed on Oct. 31, 2012, now Pat. No. 9,202,384.

(51) Int. Cl.
| | |
|---|---|
| *H04L 51/224* | (2022.01) |
| *G09B 5/08* | (2006.01) |
| *G09B 7/00* | (2006.01) |
| *H04L 69/329* | (2022.01) |

(52) U.S. Cl.
CPC ............ *G09B 5/08* (2013.01); *G09B 7/00* (2013.01); *H04L 51/224* (2022.05); *H04L 69/329* (2013.01)

(58) Field of Classification Search
CPC ......... G09B 5/08; G09B 67/00; H04L 51/224; H04L 69/329
USPC .............. 709/206, 220, 224, 226, 228
See application file for complete search history.

(56) References Cited

U.S. PATENT DOCUMENTS

| | | |
|---|---|---|
| 6,640,145 B2 | 10/2003 | Hoffberg et al. |
| 7,006,881 B1 | 2/2006 | Hoffberg et al. |
| 7,228,437 B2 * | 6/2007 | Spagna ............. H04L 67/52 713/193 |
| 7,493,396 B2 | 2/2009 | Alcorn et al. |
| 7,630,986 B1 | 12/2009 | Herz et al. |
| 7,813,822 B1 | 10/2010 | Hoffberg |
| 7,908,602 B2 | 3/2011 | Alcorn et al. |
| 7,966,078 B2 | 6/2011 | Hoffberg et al. |
| 7,987,003 B2 | 7/2011 | Hoffberg et al. |
| 8,166,003 B2 | 4/2012 | Friesenhahn et al. |
| 8,190,590 B2 | 5/2012 | Lawlor |
| 8,452,750 B2 | 5/2013 | Lawlor |
| 8,583,263 B2 | 11/2013 | Hoffberg et al. |
| 8,838,015 B2 | 9/2014 | Packard |
| 9,202,384 B2 | 12/2015 | Petker |

(Continued)

Primary Examiner — Khanh Q Dinh
(74) Attorney, Agent, or Firm — Bereskin & Parr LLP/S.E.N.C.R.L., S.r.l.

(57) ABSTRACT

System and methods of gating notifications for content objects of an electronic learning platform are described herein. The notification may be conditioned on whether the content object is available to a user receiving the notification, or the state of the content object, for example.

20 Claims, 7 Drawing Sheets

(56) References Cited

U.S. PATENT DOCUMENTS

| | | |
|---|---|---|
| 9,626,875 B2 | 4/2017 | Gal et al. |
| 9,911,353 B2 | 3/2018 | Kim et al. |
| 11,195,427 B2* | 12/2021 | Petker .................... G09B 7/00 |
| 2002/0102803 A1* | 8/2002 | Forbes ................ H01L 21/8228 438/335 |
| 2002/0107803 A1* | 8/2002 | Lisanke ............. H04L 63/0428 705/51 |
| 2003/0105718 A1* | 6/2003 | Hurtado ............... G06Q 20/401 705/51 |
| 2003/0233537 A1 | 12/2003 | Wohlgemuth et al. |
| 2004/0153509 A1 | 8/2004 | Alcorn et al. |
| 2006/0022048 A1* | 2/2006 | Johnson ............... G06Q 10/025 707/E17.117 |
| 2006/0085343 A1* | 4/2006 | Lisanke ............. H04L 63/0428 705/50 |
| 2006/0155398 A1 | 7/2006 | Hoffberg et al. |
| 2006/0240396 A1 | 10/2006 | Foo et al. |
| 2007/0061735 A1 | 3/2007 | Hoffberg et al. |
| 2007/0168424 A1 | 7/2007 | Oh et al. |
| 2007/0245020 A1 | 10/2007 | Ott |
| 2009/0049077 A1 | 2/2009 | Lawlor |
| 2009/0081006 A1* | 3/2009 | Williamson ......... B25J 15/0052 414/222.02 |
| 2009/0271762 A1 | 10/2009 | Taylor et al. |
| 2010/0008500 A1* | 1/2010 | Lisanke ............. H04L 63/0428 380/201 |
| 2010/0008550 A1* | 1/2010 | Dinerstein ............. G06F 18/40 382/118 |
| 2011/0039245 A1 | 2/2011 | Packard et al. |
| 2011/0039247 A1 | 2/2011 | Packard et al. |
| 2011/0039248 A1 | 2/2011 | Packard et al. |
| 2011/0314101 A1 | 12/2011 | Redmon et al. |
| 2013/0203035 A1 | 8/2013 | Muramatsu |
| 2017/0139939 A1 | 5/2017 | Rougier |
| 2017/0344541 A1 | 11/2017 | Haeusler et al. |

* cited by examiner

100

| | |
|---|---|
| determining whether a content object is available to at least one user, where the content object includes content for a course managed by the electronic learning platform | 102 |
| upon determining that the content object is available to the at least one user, sending a notification to the at least one user indicating that the content object is available | 104 |
| upon determining that the content object is not available to the at least one user, gating the notification until the content object is available to the at least one user | 106 |

Figure 3

Availability

Show Start Date

☑ Always show start date
*If unchecked, the start date will be visible only in the News tool to users with permission to edit news.*

Start Date —302
[2012/8/22] [10 ▽] [35 ▽] [Now]
*Canada - Toronto*

End Date —304
☐ Remove news item based on end date
[2012/8/23] [0 ▽] [00 ▽] [Now]
*Canada - Toronto*

Attachments

[Add a File] [Record Audio]

Additional Release Conditions

—310  —312
[Attach Existing] [Create and Attach]  Remove all Conditions —314

There are no conditions attached to this item.

—306  —308
[Publish] [Save as Draft] [Cancel]

Availability

Show Start Date

☑ Always show start date
*If unchecked, the start date will be visible only in the News tool to users with permission to edit news.*

Start Date —302

[2012/8/23] [11 ▼] [02 ▼] [Now]
*Canada - Toronto*

End Date —304

☐ Remove news item based on end date

[2012/8/23] [0 ▼] [00 ▼] [Now]
*Canada - Toronto*

Attachments

[Add a File] [Record Audio]

Additional Release Conditions

—310   —312

[Attach Existing] [Create and Attach]   Remove all Conditions —314

There are no conditions attached to this item.

—316   —308

[Schedule] [Save as Draft] [Cancel]

318 — ☐ Major edit — send a notification and restore it for those who dismissed it

Availability

Show Start Date

☑ Always show start date
*If unchecked, the start date will be visible only in the News tool to users with permission to edit news.*

Start Date — 302

| 2012/8/15 | 20 ▼ | 38 ▼ | Now |

*Canada - Toronto*

End Date — 304

☐ Remove news item based on end date

| 2012/8/22 | 11 ▼ | 04 ▼ | Now |

*Canada - Toronto*

Attachments

[ Add a File ] [ Record Audio ]

Additional Release Conditions

310 — [ Attach Existing ] [ Create and Attach ] — 312  Remove all Conditions  — 314

There are no conditions attached to this item.

320 — [ Update ] [ Cancel ]

*Figure 7*

SYSTEM AND METHOD FOR GATING NOTIFICATIONS

CROSS-REFERENCE TO RELATED APPLICATIONS

This application is a continuation of U.S. patent application Ser. No. 16/111,383, filed Aug. 24, 2018, which is a continuation of U.S. patent application Ser. No. 15/644,258, filed Jul. 7, 2017, now U.S. Pat. No. 10,074,287, which is itself a continuation of U.S. patent application Ser. No. 14/954,684, filed Nov. 30, 2015, now U.S. Pat. No. 9,721,477, which is a continuation of U.S. patent application Ser. No. 13/665,410, filed Oct. 31, 2012, now U.S. Pat. No. 9,202,384, the contents of all of which are hereby incorporated by reference herein.

FIELD

The embodiments described herein relate to electronic learning systems and methods, and more particularly to systems and methods for notifications relating to content objects for an electronic learning platform.

INTRODUCTION

Electronic learning (also called e-Learning or eLearning) generally refers to education or learning where users (e.g., learners, instructors, administrative staff, teaching assistants) engage in education related activities using computers and other computing devices. For example, learners may enroll or participate in a course or program of study offered by an educational institution (e.g., a college, university or grade school) through a web interface that is accessible over the Internet. Similarly, learners may receive assignments electronically, participate in group work and projects by collaborating online, and be graded based on assignments and examinations that are submitted using an electronic drop box.

Electronic learning is not limited to use by educational institutions, however, and may also be used in governments or other organizations, such as in corporate environments. For example, employees at a regional branch office of a particular company may use electronic learning to participate in a training course offered by their company's head office without ever physically leaving the branch office.

Electronic learning can also be an individual activity with no institution driving the learning. For example, individuals may participate in self-directed study (e.g., studying an electronic textbook or watching a recorded or live webcast of a lecture) that is not associated with a particular institution or organization.

Electronic learning often occurs without any face-to-face interaction between the users in the educational community. Accordingly, electronic learning overcomes some of the geographic limitations associated with more traditional learning methods, and may eliminate or greatly reduce travel and relocation requirements imposed on users of educational services.

Furthermore, because course materials can be offered and consumed electronically, there are fewer physical restrictions on learning. For example, the number of learners that can be enrolled in a particular course may be practically limitless, as there may be no requirement for physical facilities to house the learners during lectures. Furthermore, learning materials (e.g., handouts, textbooks, etc.) may be provided in electronic formats so that the learning materials can be reproduced for a virtually unlimited number of learners. Finally, lectures may be recorded and accessed at varying times (e.g., at different times that are convenient for different users), thus accommodating users with varying schedules, and allowing users to be enrolled in multiple courses that might have a scheduling conflict when offered using traditional techniques.

Users (e.g., learners, instructors, administrative staff, teaching assistants) may electronically add or edit electronic learning content, such as course material, assignments, discussion posts, and so on. Electronic learning systems and methods may provide notifications of new and edited electronic learning content to other users. There is a need for improved electronic learning systems and methods that handle notifications.

The above information is presented as background information only to assist with an understanding of the present disclosure. No determination has been made, and no assertion is made, as to whether any of the above might be applicable as prior art with regard to the present invention.

SUMMARY

In a first aspect, embodiments described herein may provide a computer implemented method of gating notifications relating to content objects of an electronic learning platform. The method may be implemented by a computer comprising a processor and a memory coupled to the processor and configured to store instructions executable by the processor to perform acts comprising determining whether a content object is available to at least one user, where the content object may include content for a course managed by the electronic learning platform; upon determining that the content object is available to the at least one user, sending a notification to the at least one user indicating that the content object is available; and upon determining that the content object is not available to the at least one user, gating the notification until the content object is available to the at least one user. The method may perform different checks to determine whether a content object is available to a user, as availability may be based on the state of the content object, permissions, release conditions, visibility, user configurations, and so on. For example, components of a notification system may determine availability by polling a database with data relating to content objects, matching the data against rules, raising events upon detecting a matched rule, handling the raised events by routing them to the appropriate component, and generating notifications based on the events. Determining availability may be based on polling data relating to content objects, raising an availability or notification event, receiving an availability or notification event, and so on.

In accordance with some embodiments, determining whether the content object is available may comprise determining a publication date of the content object, where the content object may only be available to the at least one user on or after the publication date. The publication date may be maintained as an attribute or state associated with the content object. A change in publication state may raise a notification event that may be handled by a component of the notification system.

In accordance with some embodiments, the method may further comprise scheduling the content object to be automatically published at a publication date, and wherein determining whether the content object is available comprises determining whether the publication date of the content object has occurred, wherein the content object may only be available to the at least one user if the publication date has occurred. When the content object is automatically published this may trigger a change in a publication state associated with the content object.

In accordance with some embodiments, the method may further comprise maintaining a publication state for the object indicating if the object has been published, and determining whether the content is available may comprise checking the publication state to see if the object has been published, raising a notification event at the time of publication, and so on.

In accordance with some embodiments, the method may further comprise maintaining a scheduled publication state for the content object, where the scheduled publication state indicates a publication date of when the content object will be automatically published, and determining whether the content is available may comprise checking the scheduled publication state to see if the publication date has occurred.

In accordance with some embodiments, the method may further comprise maintaining a draft state indicating if the content object is a draft. In some embodiments if the content object is a draft then the content object may not available, and determining whether the content is available may comprise checking the draft state to see if the content object is in draft. In some embodiments, draft objects may not be permitted to have notifications sent about them. In other embodiments, one or more particular users may be notified about draft-state content objects, such as when a new draft content object is created. For example, an instructor may be notified that their teaching assistant authored a draft news item for review and approval by the instructor prior to publication.

In accordance with some embodiments, the content object may be associated with at least one permission attribute and determining whether the content object is available to the at least one user may comprise checking the permission attribute. In accordance with some embodiments, determining whether the content object is available to the at least one user may comprise checking release conditions based on one or more actions performed by the at least one user. In accordance with some embodiments, determining whether the content object is available to the at least one user may comprise checking whether an event has occurred, where the event is associated with at least one user and the content object. In accordance with some embodiments, determining whether the content object is available to at least one user may comprise checking configurations associated with the user(s).

In accordance with some embodiments, the method may further comprise maintaining a notification status indicating if a notification has been sent to the at least one user for the content object, and where prior to the sending the notification to the at least one user the method may further comprise checking the notification status and not sending the notification if the notification status indicates that a notification has been sent to the at least one user for the content object. In accordance with some embodiments, the notification status may be maintained on a per user basis, where each notification status is associated with a user indicating if a notification has been sent to the user for the content object.

In another aspect, embodiments described herein may provide a method of gating notification relating to a content object of an electronic learning platform comprising: maintaining a scheduled publication state for the content object, wherein the scheduled publication state indicates a publication date of when the content object will be automatically published; gating a notification relating to the content object until the content object is published by monitoring the scheduled publication state; and sending the notification relating to the content object when the content object is published. The method may perform different checks to determine whether a content object is published to one or more users, as publication may be based on the state of the content object, permissions, release conditions, visibility, user configurations, and so on. For example, components of a notification system may determine publication by polling a database with data relating to content objects for state changes, matching the data against rules to detect particular state changes, raising events upon detecting a matched rule, handling the raised events by routing them to the appropriate component, and generating notifications based on the events. Determining publication may be based on polling data relating to content objects for state changes, raising a notification event relating to a state change, receiving the notification event, and so on.

In accordance with some embodiments, the method may further comprise maintaining a publication state for the content object indicating whether the content object has been published, where gating the notification may further comprise monitoring the publication state.

In accordance with some embodiments, the method may further comprise maintaining a draft state for the content object indicating whether the content object is a draft. In accordance with some embodiments, if the content object is a draft then the notification relating to the content object may be gated until the content object is no longer in draft. Gating the notification may further comprise monitoring the draft state. In some embodiments, draft objects may not be permitted to have notifications sent about them. In other embodiments, one or more users may be notified about draft-state objects, and a notification may not be gated for all users when a content object is in draft state. The method may further comprise indicating whether a notification regarding a content object that is a draft should be gated via another attribute, state and the like, and what users the notification should be gated for and what users should receive a notification about the content object that is a draft. For example, an instructor may be notified that their teaching assistant authored a draft content object but the students may not be notified (e.g. the notifications to students will be gated) until the instructor reviews the drat content object and approves the content object for publication, and so on.

In accordance with some embodiments, the method may further comprise setting, using an interface, the scheduled publication state for the content object by receiving the publication date. The interface may also enable setting attributes for the content object, such as permissions, visibility and so on. Further, the interface may also enable setting a draft state for the content object and scheduling publication of the content object (e.g. setting a scheduled publication state), reviewing a draft content object, editing a content object, and so on.

In accordance with some embodiments, the method may further comprise maintaining a notification status indicating whether a notification has been sent to at least one user for the content object, and where prior to sending the notification to at least one user the method may further comprise checking the notification status and not sending the notification if the notification status indicates that a notification has been sent to the user(s) for the content object.

In accordance with some embodiments, the method may further comprise maintaining a notification status on a per user basis, where each notification status is associated with a user indicating if a notification has been sent to the user for the content object.

In a further aspect, embodiments described herein may provide a system of gating notification relating to a content object of an electronic learning platform, where the system may comprise hardware and software components as described herein configured to provide at least one content object associated with a scheduled publication state, where the scheduled publication state indicates a publication date of when the content object will be automatically published, wherein the content object is operable to issue an availability event when the publication date occurs; an event handler operable to monitor for publication events and generate a notification event for the content object upon detecting a availability event issued by the content object; and a notification handler operable to monitor for notification events and to gate a notification relating to the content object until detecting a notification event for the content object.

In accordance with some embodiments, the system may further comprise an interface for setting the scheduled publication state for the content object.

In accordance with some embodiments, the at least one content object may be further associated with a draft state indicating whether the content object is a draft. In some embodiments, a content object is operable to issue the availability event when the draft state indicates that the content object is not a draft. In some embodiments, draft objects may not be permitted to have notifications sent about them (e.g. notifications may be gated until the content object is no longer in draft). In other embodiments, one or more users may be notified about draft-state objects. For example, an instructor may be notified that their teaching assistant authored a draft content object. Accordingly, a content object is operable to issue a notification event when the draft state indicates that the content object is a draft. The notification event may only relate to particular users, such as an instructor or teaching assistant, for example.

In accordance with some embodiments, the at least one content object is further associated with a publication state indicating whether the content object has been published, wherein the content object is operable to issue the availability event when the publication state indicates that the content object has been published.

In accordance with some embodiments, the at least one content object is further associated with a notification status indicating whether a notification has been sent to the at least one user for the content object.

The embodiments described herein may also provide other systems and methods as described herein, along with other features and functionalities.

In another aspect, embodiments described herein may provide a computer readable media configured for gating notification relating to a content object of an electronic learning platform, the computer readable media storing instructions executable by the processor to perform the method comprising determining whether a content object is available to at least one user, wherein the content object comprises content for a course managed by the electronic learning platform; upon determining that the content object is available to the at least one user, sending a notification to the at least one user indicating that the content object is available; and upon determining that the content object is not available to the at least one user, gating the notification until the content object is available to the at least one user. In accordance with some embodiments, the computer readable media is computer readable storage media. Other instructions may also be stored thereon as described herein.

In another aspect, embodiments described herein may provide a computer readable media configured for gating notification relating to a content object of an electronic learning platform, the computer readable media storing instructions executable by the processor to perform the method comprising: a scheduled publication state for the content object, wherein the scheduled publication state indicates a publication date of when the content object will be automatically published; gating a notification relating to the content object until the content object is published by monitoring the scheduled publication state; and sending the notification relating to the content object when the content object is published. In accordance with some embodiments, the computer readable media is computer readable storage media. Other instructions may also be stored thereon as described herein.

DRAWINGS

Various embodiments will now be described, by way of example only, with reference to the following drawings, in which:

FIG. 3 is a flow diagram of an electronic learning method for gating notifications according to some embodiments;

FIG. 5 is a screen shot diagram of an interface for setting a publication state for a content object according to some embodiments;

FIG. 6 is another screen shot diagram of an interface for setting a scheduled publication state for a content object according to some embodiments; and FIG. 7 is a further screen shot diagram of an interface for indicating that a major edit has been made to a content object according to some embodiments.

Figure 1:
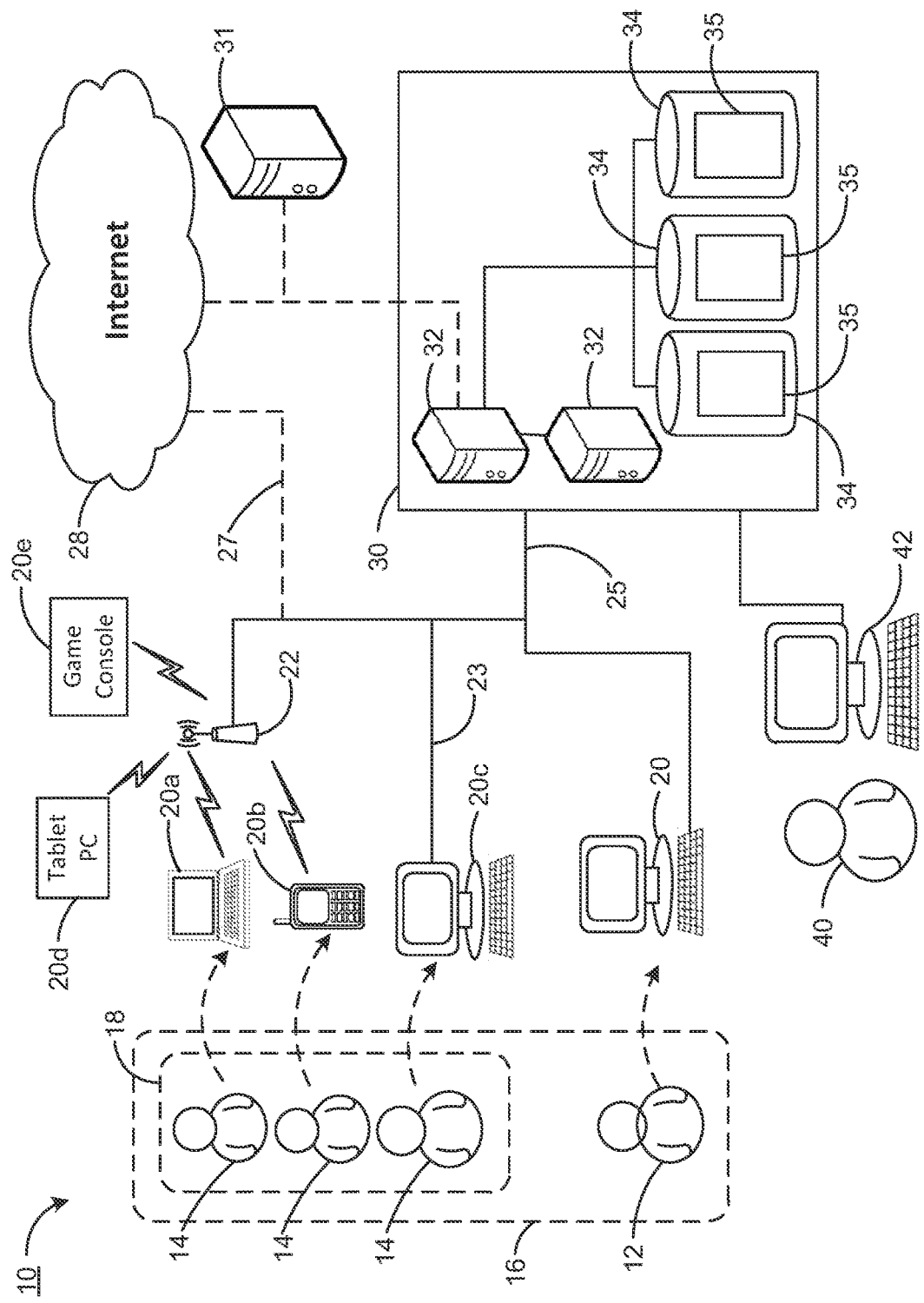
FIG. 1 is a schematic diagram of an electronic learning system according to some embodiments.

For simplicity and clarity of illustration, where considered appropriate, reference numerals may be repeated among the figures to indicate corresponding or analogous elements or steps. In addition, numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments generally described herein.

DESCRIPTION OF VARIOUS EMBODIMENTS

The embodiments of the systems and methods described herein may be implemented in hardware or software, or a combination of both. These embodiments may be implemented in computer programs executing on programmable computers, each computer including at least one processor, a data storage system (including volatile memory or non-volatile memory or other data storage elements or a combination thereof), and at least one communication interface. For example, and without limitation, the various programmable computers may be a server, network appliance, settop box, embedded device, computer expansion module, personal computer, laptop, personal data assistant, cellular telephone, smartphone device, UMPC tablets and wireless hypermedia device or any other computing device capable of being configured to carry out the methods described herein.

Program code is applied to input data to perform the functions described herein and to generate output information. The output information is applied to one or more output devices. In some embodiments, the communication interface may be a network communication interface. In embodiments in which elements of the invention are combined, the communication interface may be a software communication interface, such as those for Inter-Process Communication (IPC). In still other embodiments, there may be a combination of communication interfaces implemented as hardware, software, and combination thereof.

Each program may be implemented in a high level procedural or object oriented programming or scripting language, or both, to communicate with a computer system. However, alternatively the programs may be implemented in assembly or machine language, if desired. The language may be a compiled or interpreted language. Each such computer program may be stored on a storage media or a device (e.g., ROM, magnetic disk, optical disc), readable by a general or special purpose programmable computer, for configuring and operating the computer when the storage media or device is read by the computer to perform the procedures described herein. Embodiments of the system may also be considered to be implemented as computer-readable storage medium, configured with a computer program, where the storage medium so configured causes a computer to operate in a specific and predefined manner to perform the functions described herein. For example, computer-readable storage media may be non-transitory computer-readable media, which may include both volatile and non-volatile storage media.

Furthermore, the systems and methods of the described embodiments are capable of being distributed in a computer program product including a physical, non-transitory computer readable medium that bears computer usable instructions for one or more processors. The medium may be provided in various forms, including one or more diskettes, compact disks, tapes, chips, magnetic, volatile memory, non-volatile memory, and electronic storage media, and the like. The computer useable instructions may also be in various forms, including compiled and non-compiled code.

Referring now to FIG. 1, illustrated therein is an electronic learning system 10 according to some embodiments. The system 10 may be particularly configured for gating notifications relating to content objects. The system 10 as shown is an electronic learning system or eLearning system. However, in other instances the system 10 may not be limited to electronic learning systems and it may be other types of systems.

Using the system 10, one or more users 12, 14 may communicate with an educational service provider 30 to participate in, create, edit, and consume electronic learning services, including educational courses. In some cases, the educational service provider 30 may be part of (or associated with) a traditional "bricks and mortar" educational institution (e.g., a grade school, university or college), another entity that provides educational services (e.g., an online university, a company that specializes in offering training courses, an organization that has a training department, and the like), or may be an independent service provider (e.g., for providing individual electronic learning).

It should be understood that a course is not limited to courses offered by formal educational institutions. The course may include any form of learning instruction offered by an entity of any type. For example, the course may be a training seminar at a company for a group of employees or a professional certification program (e.g., PMP, CMA, and the like) with a number of intended participants.

In some embodiments, one or more educational groups can be defined that include one or more of the users 12, 14. For example, as shown in FIG. 1, the users 12, 14 may be grouped together in an educational group 16 representative of a particular course (e.g., History 101, French 254), with a first user 12 or "instructor" being responsible for organizing and/or teaching the course (e.g., developing lectures, preparing assignments, creating educational content etc.), while the other users 14 or "learners" are consumers of the course content (e.g., users 14 are enrolled in the course).

In some examples, the users 12, 14 may be associated with more than one educational group (e.g., the users 14 may be enrolled in more than one course, a user may be enrolled in one course and be responsible for teaching another course, a user may be responsible for teaching a plurality of courses, and so on).

In some cases, educational sub-groups may also be formed. For example, the users 14 are shown as part of educational sub-group 18. The sub-group 18 may be formed in relation to a particular project or assignment (e.g., sub-group 18 may be a lab group) or based on other criteria. In some embodiments, due to the nature of the electronic learning, the users 14 in a particular sub-group 18 need not physically meet, but may collaborate together using various tools provided by the educational service provider 30.

In some embodiments, other groups 16 and sub-groups 18 could include users 14 that share common interests (e.g., interests in a particular sport), that participate in common activities (e.g., users that are members of a choir or a club), and/or have similar attributes (e.g., users that are male, users under twenty-one years of age, and the like).

Communication between the users 12, 14 and the educational service provider 30 can occur either directly or indirectly using any one or more suitable computing devices. For example, the user 12 may use a computing device 20 having one or more client processors such as a desktop or mobile computer that has at least one input device (e.g., a keyboard, a mouse, touch screen, and the like) and at least one output device (e.g., a display screen, speakers, and the like).

The computing device 20 can generally be any suitable device for facilitating communication between the users 12, 14 and the educational service provider 30. For example, the computing device 20 could be a laptop 20a wirelessly coupled to an access point 22 (e.g., a wireless router, a cellular communications tower, and the like), a wirelessly enabled Personal Data Assistant (PDA) 20b or smart phone, a terminal 20c, a tablet computer 20d, or a game console 20e operating over a wired connection 23.

The computing devices 20 may be connected to the service provider 30 via any suitable communications channel. For example, the computing devices 20 may communicate to the educational service provider 30 over a Local Area Network (LAN) or intranet, or using an external network (e.g., by using a browser on the computing device 20 to browse to one or more web pages or other electronic files presented over the Internet 28 over a data connection 27).

In some examples, one or more of the users 12, 14 may be required to authenticate their identities in order to communicate with the educational service provider 30. For example, each of the users 12, 14 may be required to input a user identifier such as a login name, and/or a password associated with that user or otherwise identify themselves to gain access to the system 10.

In some examples, one or more users (e.g., "guest" users) may be able to access the system without authentication. Such guest users may be provided with limited access, such as the ability to review one or more components of the course to decide whether they would like to participate in the course but without the ability to post comments or upload electronic files.

In some embodiments, the wireless access points 22 may connect to the educational service provider 30 through a data connection 25 established over the LAN or intranet. Alternatively, the wireless access points 22 may be in communication with the educational service provider 30 via the Internet 28 or another external data communications network. For example, one user 14 may use a laptop 20a to browse to a webpage that displays elements of an electronic learning system (e.g., a course page).

The educational service provider 30 generally includes a number of functional components for facilitating the provision of electronic learning services. For example, the educational service provider 30 generally includes one or more processing devices such as servers 32, each having one or more processors. The processors on the servers 32 will be referred to generally as "remote processors" so as to distinguish from client processors found in computing devices (20, 20a-20e). The servers 32 are configured to send information (e.g., electronic files such as web pages) to be displayed on one or more computing devices 20 in association with the electronic learning system 10 (e.g., course information). In some embodiments, a server 32 may be a computing device 20 (e.g., a laptop or personal computer).

The educational service provider 30 also generally includes one or more data storage devices 34 (e.g., memory, and the like) that are in communication with the servers 32, and could include a relational database (such as a SQL database), or other suitable data storage devices. The data storage devices 34 are configured to host data 35 about the courses offered by the service provider (e.g., the course frameworks, educational materials to be consumed by the users 14, records of assessments done by users 14, tests and results, assignments, and the like). Data storage devices 34 may also store material related to a course as content objects or as data structures that store content for a course along with metadata about the content, or attributes of the content. Data storage devices 34 are operable to store content for educational service provider 30 such as content objects for course lectures, lesson plans, course framework, assignments, tests, comments, discussion posts, uploaded electronic files, news items, data feed items, and so on.

The data storage devices 34 may also store authorization criteria that define what actions may be taken by the users 12, 14. In some embodiments, the authorization criteria may include at least one security profile associated with at least one role. For example, one role could be defined for users who are primarily responsible for developing an educational course, teaching it, and assessing work product from other users for that course. Users with such a role may have a security profile that allows them to configure various components of the course, post assignments, add assessments, evaluate performance, create new content objects for the course, edit content objects for the course, and so on.

In some embodiments, some of the authorization criteria may be defined by specific users 40 who may or may not be part of the educational community 16. For example, administrator users 40 may be permitted to administer and/or define global configuration profiles for the system 10, define roles within the system 10, set security profiles associated with the roles, and assign the roles to particular users 12, 14 in the system 10. In some cases, the users 40 may use another computing device (e.g., a desktop computer 42) to accomplish these tasks.

The data storage devices 34 may also be configured to store other information, such as personal information about the users 12, 14 of the system 10, information about which courses the users 14 are enrolled in, roles to which the users 12, 14 are assigned, particular interests of the users 12, 14, assessment data of users 12, 14, content for the courses from users 12, 14 and so on.

In some embodiments, the system 10 may also have one or more backup servers 31 that may duplicate some or all of the data 35 stored on the data storage devices 34. The backup servers 31 may be desirable for disaster recovery (e.g., to prevent undesired data loss in the event of an event such as a fire, flooding, or theft). In some embodiments, the backup servers 31 may be directly connected to the educational service provider 30 but located within the system 10 at a different physical location.

The servers 32 and data storage devices 34 may also provide other electronic learning management tools (e.g., allowing users to add and drop courses, communicate with other users using chat software, discussion forums, and the like), and/or may be in communication with one or more other vendors that provide the tools. An electronic learning management tool may include a tool for gating notifications, as will be further discussed in relation to FIG. 2.

Embodiments described herein may provide a workflow-based method and system of gating the sending of automated notifications to users 14, 12. The notifications may relate to content creation and editing, updates from data feeds, new posts on discussion forums, and so on. For example, a content object relating to a course may include course content, such as a reading assignment. The content object may initially be hidden from some or all users 14 enrolled in the course and may become available to those users 14 on a specific date or in response to a user 14 activity (e.g., completing a previous reading assignment). When the content object becomes available to users 14 a notification regarding the content object may be sent to the users 14. Example notifications may include but are not limited to email message notifications, SMS text message notifications, social network notifications, third party platform notifications, and so on. System 10 is operable to gate notifications about content objects until the content object is available to users 14, specific conditions have been met, the content object has been published, a date has occurred (e.g., a publication date), an event has occurred (e.g., a user 14 has completed an assignment), the content object is visible, and so on.

In other example embodiments, notifications may also relate to assessed content items. For example, a notification may notify a user 14 that their quiz or assignment is due in 2 days. As a further example, a notification may notify a user that their content object has been assessed by a peer, by another user 14, 12 such as instructor or teaching assistant, and so on. In further example embodiments, notifications may also relate to communications from users 14. Such notifications may be related to events raised by an email tool, pager tool, and other communication tools that may be provided by system 10 or integrate with system 10.

Embodiments described herein may address the situation where a content creator (e.g., user 12, 14) may wish to withhold notifying other users 14, 12 about a new or updated content object by gating notifications relating to that content object for one or more users 14, 12. For example, a content object may be required to go through a copy editing process before it is made generally available to learners 14 or other users 14, while an instructor 12 may receive notification about the newly created content object so that they may review the content object prior to general publication to the learners 14. Embodiments described herein may provide an intuitive workflow which allows content creators to gate the sending of notifications for content objects until such time as they permit notifications to be sent. Embodiments described herein may provide a workflow to gate the sending of notifications without unduly burdening the content creator. In this workflow, each content object may be associated with a particular state which unambiguously indicates whether notifications have been sent about this particular object. Further, a content object may be associated with a particular state which indicates whether the content object is a draft or has already been published. Notifications for the content object may be gated until the content object is published and no longer a draft, along with other conditions, for example. In other embodiments, notifications related to draft-state objects may not be gated in relation to particular users 12, 14. For example, an instructor 12 may be notified that their teaching assistant authored a draft content object for a course, such as a news item, assignment, quiz, or course content. A content object may be associated with a particular state which indicates a scheduled publication data for the content object and notifications for the content object may be gated until the scheduled publication occurs.

For example, a content object may be associated with the following example three states:

Draft State: Indicates whether the content object is a draft object. In some embodiments, draft objects may not be permitted to have notifications sent about them. In other embodiments, one or more particular users 14 may be notified about draft-state objects;

Publication State: Indicates whether the content object has been published. Published objects are generally available and may have notifications sent to this effect (or already had notifications sent to this effect);

Scheduled Publication State: Indicates the date at which the content object is scheduled to be automatically published. Scheduled objects are content objects that are due to be published at some point in the future. Scheduled objects may have notifications sent at the time their publish date arrives. Scheduled objects may trigger the gating of notifications until their publish date arrives.

These are example states and other states may also be associated with the content object. As a further example, a content object may be associated with a notification status indicating whether a notification has already been sent to one or more users 14 regarding the content object. The notification status may be maintained on a per user 14 basis indicating whether a notification has been sent to a particular user 14. In accordance with some embodiments, content objects may be associated with an "archived" state and one or more users 14 may be notified about the archived content objects. An archived object may be a content object that has been published but is no longer generally available. In accordance with other embodiments, content objects may be associated with a "deleted" state and one or more users 14 may be notified about the deleted content objects. A deleted content object may be a content object that has been published but has since been deleted, and thus no longer generally available.

Embodiments described herein may provide a combination of unambiguous content object states for determining when notifications are sent along (or gated) with a workflow for setting the content object's status in order to provide a user-friendly way of gating automated notifications for content objects in response to notification events (e.g., creation and editing of content items). Notifications may be instantaneous, or a number of notifications may be collected together, and sent in a single summary notification email itemizing the collected notifications. Collecting notifications for a summary may effectively gate notifications until the summary is delivered to a user 14. Scheduling delivery may be set by user configurations or preferences, for example. Scheduling delivery may also be based on a default schedule, as another example. Embodiments described herein may enable simple and intuitive setting of one or more states for a content object for the user 14, 12, without requiring the user 14, 12 to perform extraneous tasks. As one example, embodiments described herein may provide an interface that replaces the normal "save" or "create" buttons typically seen in content creation workflows with buttons which explicitly call out the action being performed on the content object (i.e., which state the content object will have after clicking the button). For example, the action may involve setting one or more states. Using these buttons as dual-use "save" and "set status" actions means that users 14, 12 may have no or little extra work to perform than they did previously, while at the same time reducing any anxiety that the content object will end up with an incorrect state (and thus, potentially send notifications when it was not desired). Example interfaces will be described herein in relation to FIGS. 5, 6, and 7.

Figure 2:
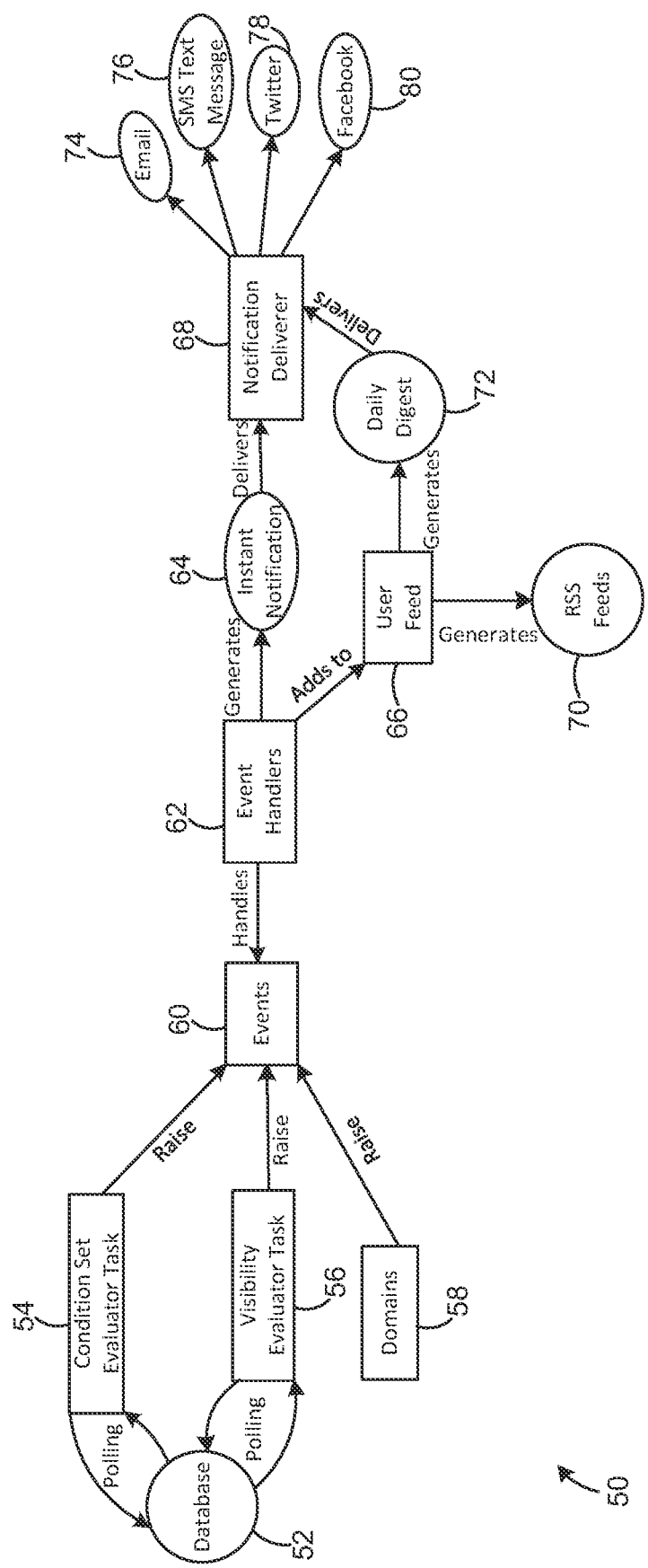
FIG. 2 is a schematic diagram of a notification system for gating notifications according to some embodiments.

Referring now to FIG. 2, there is shown a schematic diagram of a notification system 50 that may be implemented by one or more servers 32 and data storage devices 34 of the educational service provider 30 (FIG. 1) according to some embodiments. Notification system 50 is operable to send notifications relating to content objects to one or more users 14, 12. One or more processors may configure the notification system 50 to gate notifications relating to content objects until certain conditions are met, events occur, dates occur, and so on.

A content object contains data or content related to the educational service provider 30 such as general course content, assignments, tests, messages, discussion posts, authorization data, and so on. A content object may be created and edited. As noted herein, a content object may be associated with states, such as a publication state, a draft state, and a scheduled publication state, for example. Some users 12 may not have access to the content object until it becomes "available" as codified and automated by release conditions, visibility, permissions, states, and events. For example, a content object may be a reading assignment that may not be available to students until a specified date. A teacher may upload all reading assignments for the course at once and specify the publication date for each reading assignment by setting the corresponding scheduled publication state. Each reading assignment may be saved as a separate content object. As another example, a content object may be a message on a discussion forum for the course and may only be available and accessible by students enrolled in the course or participating in the discussion forum. As further example, a content object may be a news article or a daily digest (summary) of news articles and may only be available to students that subscribe to the news or daily digest. As another example, a content object may be an assessment-related object, such as for example grades, rubrics, and so on.

Database 52 may be implemented by storage devices 34 and may store data for part or all of system 10. The data may include content objects, course data, administrative data, attendance data, data feeds, metadata, attributes and so on. For example, database may include content objects and metadata about (or attributes of) the content objects including the creator, creation data, and states such as schedule publication state, publication state, draft state and so on. Database 52 may also store user preference data, configuration data, log data, enrollment data, assessment data, and so on.

Condition set evaluator task 54 is a service that polls database 52 to determine whether conditions relating to the data have been met. The conditions may include release conditions which may specify when a content object is accessible (or may be released) to users 14, 12. When a release condition is met, then a content object may be released to all users 14, a subset of users 14, or no users 14, for example, as specified in the release condition. A release condition may be general to all users or specific to individual users 12 or a subgroup thereof. When the condition set evaluator task 54 determines that a release condition has been met then condition set evaluator task 54 raises an event. For example, the event may be a notification event indicating that one or more users 14 should be notified about a content object associated with the release condition that was met. The condition set evaluator task 54 may be implemented as a rules engine with rules that define the conditions. The condition set evaluator task 54 may match the rules against the data of database 52 to determine whether a rule has been met. If one or more rules are met then condition set evaluator task 54 raises one or more corresponding events.

Release conditions may relate to actions performed by users 14, and may be event-based or date-based. For example, a content object may include content for an answer key to an assignment for a course and a release condition may specify that the content object may not be released to a user 14 until she/he has completed the assignment or until all users 14 enrolled in the course have completed the assignment. As a further example, a content object may include content for lecture notes for a course and a release condition may specify that the content object may not be released to users 14 enrolled in the course until the date of respective lecture, or unless the user 14 attends the lecture. A release condition may specify whether a notification event should be raised when a content object is updated or edited. For example, condition set evaluator task 54 is operable to poll database 54 and identify an update to a content object. A release condition may specify that notification should be sent for major edits to a content object (e.g., as compared to minor edits regarding grammar, typos, and the like) and accordingly, condition set evaluator task 54 will only raise a notification event for the update if it is determined to be a major edit. Condition set evaluator task 54 is operable to check multiple conditions relating to the same content object before raising a notification event to ensure all release conditions relating to the content object have been met. Alternatively, another component of notification system 50 may be operable to check multiple conditions (or notification events) relating to the same content object before sending a notification to ensure all conditions relating to notification of the content object have been met (i.e., gate the notification until all conditions relating to notification of the content object have been met). Conditions may also be based on a user's role and/or course enrollments. The system 10 may also be operable to notify users 12, 14 when they haven't logged into the system in a given number of days. Additionally, system-generated events (such as system failures) may generate events and notifications.

Visibility evaluator task 56 is a service that polls database 52 to determine whether conditions relating to visibility have been met. Additional conditions may relate to user access or user permissions. Visibility evaluator task 56 may be implemented as a rules engine where the rules define the visibility conditions. The visibility evaluator task 56 may match the rules against the data of database 52 to determine whether a rule has been met and if so visibility evaluator task 56 may raise an event. For example, the event may be a notification event to notify one or more users that a content object is now visible to the user(s) 14 or that the user(s) 14 are permitted to access the content object.

Visibility conditions may relate to a content object (e.g., a visibility condition for a content object may indicate whether to show/hide the respective content object) and access/permissions conditions may relate to a user 14 (e.g., an access condition for a content object may indicate whether one or more user 14 are permitted to access the content object). For example, a visibility condition for a content object may indicate that the content object is hidden to all users 14 or some users 14 until the condition is met. Visibility conditions may be set or updated by particular users 14 with corresponding authorization.

For example, the creator of a content object may have authorization to set a visibility condition to hide the content object from all users 14. The creator may then subsequently update the visibility condition to show the content object to a subset of users 14. When the visibility evaluator task 56 determines that a visibility condition has been met then visibility evaluator task 56 raises an event. For example, the event may be a notification event to notify that a content object is now visible to an individual user 14, all users 14, or a subset thereof. For example, a content object may have a hide/show attribute and the content object creator or administrator may hide the content object by setting the attribute to hide and may show the content object by setting the attribute to show.

Visibility evaluator task 56 may implement conditions relating to the states of a content object, such as for example, a condition that the publication state be true, the draft state be false or the schedule publication state refer to a date/time that has occurred. When the state related visibility condition has been met, then visibility evaluator task 56 raises a notification event. For example, a content object may not be visible to any user 14 if its draft state is true (or may only be available to a particular user 12) and its publication state is false, but may become visible to users 14 when its publication state becomes true and its draft state becomes false. As a further example, a content object may not be visible to any user 14 if its scheduled publication date refers to a future date, but may be visible to users 14 when its publication state refers to a date that has occurred. Visibility evaluator task 56 is operable to raise a notification event when the visibility of the content object has changed based on the change to the states associated with the content object.

Visibility evaluator task 56 is operable to maintain conditions relating to access/permissions for the content object. Access and permissions may relate to particular users 14. For example, a user 14 may be auditing a course and may not have permission to view specific content objects regardless of whether release conditions and visibility conditions relating to the content object have been met. Release conditions may be a special construct that may be configured by the content author. For example, FIG. 5 at 310 and 312 shows an example interface of creating release conditions, whereas at 302 and 304 shows an example interface for visibility conditions (e.g., a content object is only visible from 8 am to 5 pm today, hide this discussion topic). A change to the visibility of the content object could trigger a notification event. Permission conditions may restrict the access of a user to one or more content objects. An example is "this user cannot see News Items", and such permissions conditions would preclude the user 14 from ever receiving notifications about restricted content objects.

Domains 58 are groups of content objects, wherein each group represents a tool or business object of system 10. For example, domains 58 may represent news items, discussion posts, grades, quizzes, assignments, data feeds, and so on. Domains 58 also raise notification events, such as for example, when a new news item is received or new grades are posted. Domains 58 may allow for programmatic actions that may normally take place in a user interface. For example any sort of Create/Read/Update/Delete action taken in the domain 58 of a content object could raise a notification. System events (e.g., system level errors) that occur in a domain 58 may also raise notifications.

Events service 60 is a service that receives events raised by components such as condition set evaluator task 54, visibility evaluator task 56, and domains 58. Events service 60 receives different types of events, including notification events. Events service 60 provides the received events to event handler 62 for routing to the appropriate component based on the type of event.

A content object may not be "available" to a user 14 until all associated visibility conditions and release conditions are met. A user 14 may not receive a notification for a content object unless the content object is available to the user 14. Accordingly, multiple notification events from different components may be required before the content object is available to a user 14 and a notification message may be sent to the user 14 about the content object. In accordance with some embodiments, events service 60 may hold off routing certain events to event handler 62 until all required events are raised. For example, events service 60 may effectively gate notifications by not passing on the raised notification events for a content object until all required notification events are received. For example, a content object may be published (i.e., publication state true) but a user 14 may not be notified until they have completed an assignment in the course as specified in a release condition. Further, a user 14 may have completed the assignment in the course (as specified in a release condition) but events service 60 may not provide the notification event until the content object is published (i.e., publication state true) and no longer in draft (i.e., draft state false). Events service 60 is operable to determine whether a content object associated with a notification event is available to one or more users 14 prior to sending the notification event to instant notification 64. Events services 60 may perform different event checks to determine whether a content object is available to a user 14, as availability may be based on the state of the content object, permissions, release conditions, visibility, user configurations, and so on. Accordingly, one content object may require notification events to be raised by different components for the content object to become available.

In accordance with some embodiments, events service 60 is operable to gate the sending of notification events regarding a content object until receiving a notification event indicating that the content object has been published. For example, events service 60 is operable to check the publication state of a content object upon receiving a notification event relating to the content object to determine whether the content object has been published and if not, events service 60 may gate the notification event until the content object has been published (as may be indicated by a notification event being raised or a state check). Event service 60 may be a general system for picking up events raised in other systems, and giving that event to appropriate event handlers (e.g., event handler 62). Some of these event handlers may be specifically concerned with publishing notifications (e.g., instant notification 64, user feed 66).

Event handler 62 is a component of notification system 50 that consumes events raised to events service 60. For example, event handler 60 listens to events service 60 for events and routes the events to the appropriate recipient component depending on the type of event. Event handler 62 may be configured with business logic or a plug in indicating which specific types of events should be sent to specific components. For example, event handler 62 is operable to route notification events to instant notification 64. As another example, event handler 62 is operable to route notification events and data pertaining to the associated content object to user feed data structure 66 to compile RSS feeds (compiled by RSS feeds service 70) or a daily digest (compiled by daily digest service 72). The event handler 62 triggers a notification message regarding a content object to be sent via instant notification 64 or added to a user feed (indirect notification) via user feed data structure 66. Event handlers 62 may not be specific to notifications and may perform other sorts of custom logic or developers configurations.

Instant notification 64 is a service that receives notification events from event handler 62 and, in response, generates notification messages for content objects based on the received notification events for provision to one or more users 14. For example, instant notification 64 listens for notification events from events service 60 and generates notification messages in response. Instant notification 64 may generate notification messages based on user configurations and delivery preferences. For example, a user configuration may specify that a particular user 14 only wants to receive notifications every Monday and instant notification 64 is operable to queue notification messages for notification events that came in on other days and hold until Monday. Further, user configurations may specify a template for the notification messages indicating what data should be included in the notification message and its layout. User configurations may also indicate formatting preferences for the notification message and may indicate preferred types of notification messages (e.g., SMS, email, social media messages, and the like).

In accordance with some embodiments, prior to sending a notification message regarding a content object, instant notification 64 is operable to validate that the content object is "available" to the recipient user 14 of the notification message. For example, instant notification 64 is operable to determine whether a content object associated with a notification event is available to one or more users 14 prior to sending the notification message. Different notification event checks may be made to determine whether a content object is available to a user 14, as availability may be based on the state of the content object, permissions, release conditions, visibility, and so on. Accordingly, instant notification 64 may require notification events to be raised by different components for the content object to become available and a corresponding notification message to be sent. In accordance with some embodiments, if the notification event does not relate to a change of the draft state, publication state or scheduled publication state of the content object then the instant notification 64 may check the draft state, publication state, or scheduled publication state of the content object prior to providing the notification message to notification deliverer 68. Instant notification 64 may gate the creation of the notification message until the publication state is set to true, the draft state is set to false or the scheduled publication state date has occurred. As described herein, event handler 62 may gate providing a notification event to instant notification 64, which may also gate the creation of the notification message.

Notification deliverer 68 is operable to deliver notification messages received from instant notification 64 to users 14 in a variety of formats (e.g., email, SMS, MMS, social media messages, and so on) by interfacing with different components such as an email service 74, SMS text message service 76, a Twitter™ service 78, a Facebook™ service 80, and other messaging services. Notification deliverer 68 may format the notification message based on user configurations, a default format setting, a default delivery setting type of notification, and so on. Each of email service 74, SMS text message service 76, a Twitter™ service 78, a Facebook™ service 80 are configured to send notification messages via email, SMS text message, Twitter™, and Facebook™ respectively. Notification deliverer 68 is further operable to queue notification messages until hardware resources are available for delivery.

User feed data structure 66 receives events from event handlers 62 relating to user feeds. In response, user feed data structure 66 is operable to generate content for RSS feeds for provision to RSS feeds service 70 and content for daily digests for provision to daily digest service 72. The content for RSS feeds and daily digests may pertain to newly available, released or visible content objects, news items, new discussion posts, and so on. For example, domains 58 may include news feeds (or other data feeds) and may raise an event relating to a new or updated news item to events service 60 which in turn may provide the event to event handler 62 which will route the event to user feed data structure 66. A user may subscribe to a data feed, discussion forum, and so on and may receive notifications and subscription content in an RSS feed (via RSS feed service 70) or a daily (or other period such as weekly or bi-weekly or monthly) digest (via daily digest service 72). Event handler 62 is configured to route events pertaining to subscription content to user feed data structure 66 to trigger generation of daily digests and RSS feeds. Accordingly, the events may include content for inclusion in daily digests and RSS feeds or may contain a reference (such as an address or identifier) to the content. The user feed data structure 66 may also generate navigation bar alerts, which may be a form of notification message.

RSS feed service 70 is operable to generate an RSS feed for delivery to one or more users 14. User feed data structure 66 receives an event that relates to an RSS feed and, in turn, provides the event or content relating to the event to RSS feed service 70 to generate the RSS feed. An RSS feed may be configured to a particular user 14 based on user configurations, or may be general for multiple users 14. The RSS feed may include text, audio, images, video, and so on. The RSS feed may include full or summarized content, and metadata such as creation date, publication data, and authorship.

Daily digest service 72 is operable to generate a periodic digest (daily, weekly, bi-weekly, monthly, and so on) of content for delivery to one or more users 14. The digest may be a summary of events (and corresponding content objects) that have occurred or will occur during the relevant period, such as assignments, tests, discussions, new content, updated content, readings, and so on. Daily digest service 72 may provide the generated digest to notification deliverer for delivery to users via a variety of services such as email service 74, SMS text message service 76, a Twitter™ service 78, a Facebook™ service 80, and other messaging services. A daily digest may be configured to a particular user 14 based on user configurations, or may be general for all users 14, or a subset thereof.

Accordingly, notification system 50 is operable to gate sending notification messages relating to a content object of an electronic learning platform to a user 14 until the content object is published, visible, accessible, and/or available to the user 14.

Referring now to FIG. 3, there is shown a flow diagram of an electronic learning method 100 for gating notifications according to some embodiments.

At 102, notification system 50 is operable to determine whether a content object is "available" to at least one user 14, 12, where the content object includes content for a course managed by the electronic learning platform. The content object may be available to one or more users 14, 12 based on publication states, permissions, release conditions, user configurations, visibility conditions, events, and so on. Notification system 50 is operable to perform various checks in relation to the content object to determine whether it is available. Notification system 50 may gate the sending of notifications for a content object to users 14, 12 until the respective content object is available to the users 14, 12. The content object may be available to different users 14, 12 at different times.

In accordance with some embodiments, notification system 50 may be operable to determine whether the content object is available based on publication of the content object. For example, notification system 50 is operable to determine a publication date of the content object. The content object may only be available to user(s) 14 on or after the publication date. Notification system 50 may be operable to maintain a publication state for the content object indicating if the object has been published. Notification system 50 may be operable to determine whether the content is available by checking the publication state to determine whether the content object has been published. Further, notification system 50 may be operable to maintain a scheduled publication state for the content object. The scheduled publication state may indicate a publication date of when the content object will be automatically published. Notification system 50 may be operable to determine whether the content is available by checking the scheduled publication state to determine whether the publication date has occurred. Further, notification system 50 may be operable to maintain a draft state indicating if the content object is a draft. If the content object is the draft (draft state is set to true) then the content object is not available. Notification system 50 may be operable to determine whether the content is available by checking the draft state to determine whether the content object is the draft. For example, notification system 50 is operable to gate the sending of notifications for a content object to users 14, 12 until the content object is published, which may be based on one or more of a publication state, draft state, and scheduled publication state.

In accordance with some embodiments, notification system 50 may be further operable to schedule the content object to be automatically published at a publication date. Notification system 50 is operable to determine whether the content object is available by determining whether the publication date of the content object has occurred. The content object may only be available to the at least one user if the publication date has occurred. Further, notification system 50 is operable to determine whether the content object is available by determining whether the draft state is false/true, or determining whether the publication state is true/false, for example.

In accordance with some embodiments, notification system 50 may be further operable to maintain a notification status indicating if a notification for the content object has been sent to the at least one user 12, 14. Prior to the sending the notification to the at least one user 14, 12, notification system 50 may check the notification status and not send (or gate) the notification if the notification status indicates that a notification for the content object has been sent to the user. In accordance with some embodiments, notification status may be on a per notification type basis. Notification system 50 may further check if the same type of notification has been sent to the user 14, 12 and not send (or gate) the notification if the notification status indicates that the same type of notification for the content object has been sent to the user 12, 14. For example, a first notification may be sent to a user 14, 12 when a content object is newly created and published and a second notification may be send to the same user 14, 12 if the same content object is subsequently updated by a major edit. Notification system 50 may be operable to maintain a notification status on a per user basis, where each notification status is associated with a user indicating if a notification for the content object has been sent to that user.

The content object may be associated with at least one permission attribute. Prior to sending a notification for the content object to a user 12, 14, notification system 50 is operable to determine whether the content object is available to the user 12, 14 by checking the permission attribute. As another example, the content object may be associated with at least one release condition. Prior to sending a notification for the content object to a user 12, 14, notification system 50 is operable to determine whether the content object is available to at least one user by checking release conditions based on one or more actions performed by the user(s). As a further example, the content object may be associated with at least one event condition. Prior to sending a notification for the content object to a user 12, 14, notification system 50 is operable to determine whether the content object is available to the user 12, 14 by checking whether an event has occurred, wherein the event is associated with at least one of the users and the content object. As another example, notification system 50 is operable to determine whether the content object is available to the at least one user by checking configurations associated with the at least one user.

At 104, upon determining that the content object is available to the at least one user, notification system 50 is operable to send a notification message to the at least one user indicating that the content object is available. As noted herein, the content object may be available to one or more users 14, 12 based on publication states, permissions, release conditions, user configurations, visibility conditions, events, and so on. When the content object becomes available a notification event may be raised to events service 60, which in turn provides the raised notification event to event handler 62 to route the notification event to the appropriate component. For example, event handler 62 may route the notification event to instance notification service 64 to generate a notification message for the content object. The generated notification may be provided to notification deliverer 68 which in turn interfaces with a variety of delivery services such as email service 74, SMS text message service 76, a Twitter™ service 78, a Facebook™ service 80, and other messaging services. The notification message may be formatted based on the recipient user 12, 14 via user configurations.

At 106, upon determining that the content object is not available to the at least one user, notification system 50 is operable to gate the notification (by gating a notification event or a notification message) until the content object is available to the at least one user. In accordance with some embodiments, a content object may be available once it is published. Accordingly, notification system 50 is operable to gate the notification (by gating the notification event or notification message) until the content object is published. In accordance with other embodiments, multiple events may be required and multiple conditions must be met before the content is available to a user. For example, a content object may be in draft and then may be subsequently published, however, the published content object may not be available to a user 12, 14 until the user performs an action, such as completing an assignment.

Figure 4:
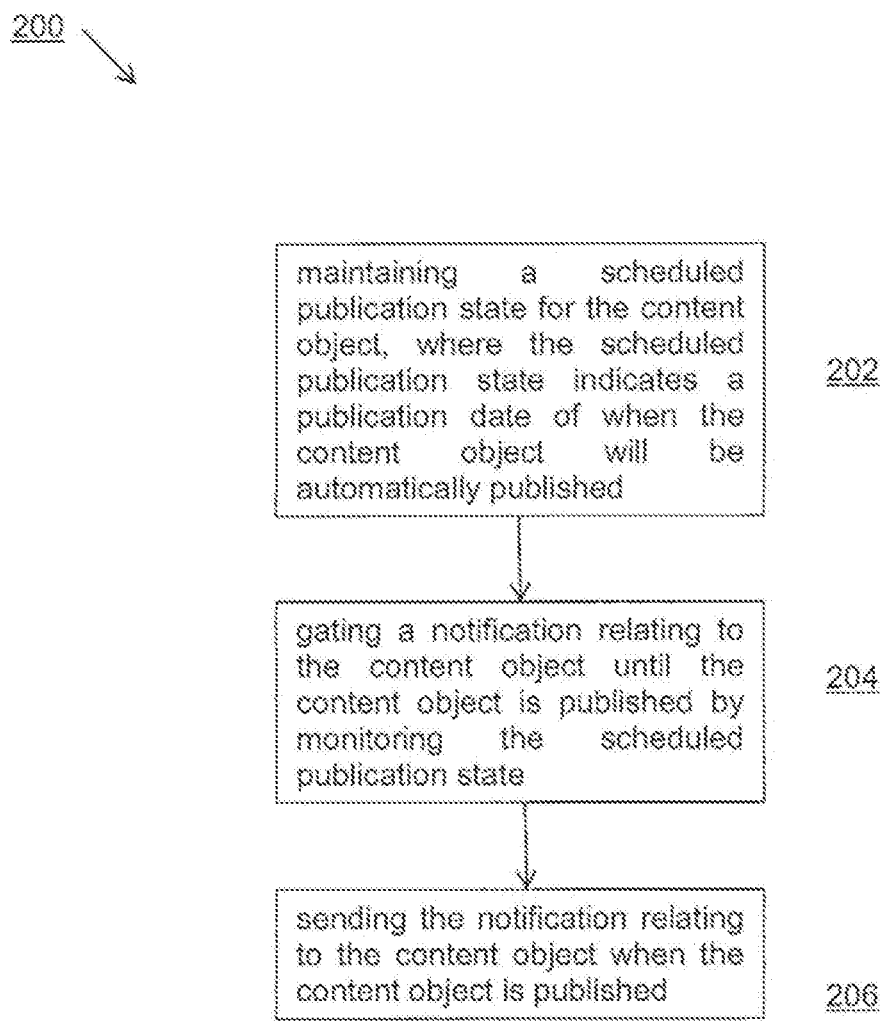
FIG. 4 is another flow diagram of an electronic learning method for gating notifications according to some embodiments.

Referring now to FIG. 4, there is shown a flow diagram of another electronic learning method 200 for gating notifications according to some embodiments. Notifications may be gated until the content object is available to the user 12 receiving the notification. An example check relating to a content object's availability is a status check.

At 202, notification system 50 is operable to maintain a state relating to publication of a content object. A content object may trigger an event regarding a change in state. Event services 60 listens for events and receives notification that a state of an object has changed. For example, notification system 50 is operable to maintain a scheduled publication state for the content object, where the scheduled publication state indicates a publication date of when the content object will be automatically published. Notification system 50 is operable to gate notification until the scheduled publication date has occurred. As another example, notification system 50 is further operable to maintain a publication state for the content object indicating whether the content object has been published. If the content object is not published (publication state set to false) then the notification relating to the content object is gated until publication of the content object (publication state set to true). As a further example, notification system 50 is further operable to maintain a draft state for the content object indicating whether the content object is a draft. If the content object is a draft (draft state set to true) then the notification relating to the content object is gated until it is no longer in draft state (draft state set to false). Notification system 50 is also operable to maintain a notification status indicating whether a notification has been sent to the at least one user for the content object. Notification system 50 is also operable to maintain a notification status on a per user basis, where each notification status is associated with a user indicating if a notification for the content object has already been sent to that user. The notification status may also be on a per notification type basis. For example, a notification may be sent when a new content object is created, and an additional notification may be sent when a major edit is made the content object.

Notification system 50 is further operable to set, using an interface, the scheduled publication state or the publication state for the content object by receiving the publication date or a publication action. Referring now to FIG. 5, there is shown an interface 300a for setting availability for a content object. The interface 300a may include a start date field 302 for setting a start date for the content object. A content object may only be available on or after the start date. The start date may be a scheduled publication date. The interface 300a may include an end date field 304 for setting an end date for the content object. A content object may no longer be available after the end date. For example, a content object may only be available during the period between the start date and the end date.

The interface 300a may include a publication button 306 for receiving an action (e.g., mouse click, touch, tap, and the like) to trigger publication of the content object. Upon detecting the action on publication button 306, notification system 50 is operable to publish the content object and update the publication state (e.g., set the publication state to true). The interface 300a may include a save as draft button 308 for receiving an action (e.g., mouse click, touch, tap) to trigger saving the content object as a draft. Upon detecting the action on the save as draft button 308, notification system 50 is operable to save the content object and update the draft state (set the draft state to true).

Notification system 50 is operable to gate notifications when the content object is a draft (draft state set to true). When the draft state is updated to indicate that the content object is no longer a draft (draft state update to false) then notification system 30 may raise a notification event to events service 60 indicating that the content object is no longer a draft. At such time notification system 30 may no longer gate notifications about the content object to a user provided that the content object has been published and is available to user (e.g., release and visibility conditions are met, compliance with permissions and user configurations, and so on). When the draft state of a content object changes to indicate that the content object is no longer a draft this may trigger an automatic publication of the content object and corresponding update to publication state. In other cases, an action on publication button 306 is required to publish the content object or setting and reaching of a scheduled publication date is required to publish the content object.

Interface 300a may include a mechanism for setting and removing release conditions for a content object. Interface 300a may include an attach existing release condition button 310 for receiving an action (e.g., mouse click, touch, tap, and the like) to trigger attachment of an existing release condition to the content object. This enables notification system 50 to reuse existing release conditions for multiple content objects. Interface 300a may include a create release condition button 312 for receiving an action (e.g., mouse click, touch, tap) to trigger creation of a release condition for the content object, and attachment of the newly created release condition to the content object.

Interface 300a may also include a remove release conditions button 314 to remove some or all release conditions attached to a content object.

Referring now to FIG. 6, there is shown another interface 300b for setting availability for a content object. Interface 300b may include a schedule publication button 316 for receiving an action (e.g., mouse click, touch, tap) to trigger setting a date/time when the content object will automatically be published. Upon detecting the action on schedule publication button 316, notification system 50 is operable to update the scheduled publication state of the content object (set the scheduled publication date value). A content object may not be available (not published) until the scheduled publication data occurs and notification system 50 is operable to gate notifications relating to the content object until the scheduled publication data occurs.

Referring now to FIG. 7, there is shown an interface 300c for updating a content object. Notification system 50 is operable to send notifications when a content object is updated or edited. In accordance with some embodiments, interface 300c includes an update button 320 for receiving an action (e.g., mouse click, touch, tap) to trigger an update or edit to a content object. For example, course content may be edited by a user or metadata (e.g., states, attributes) about the content object may be edited by a user. Upon detecting the action on update button 316, notification system 50 is operable to update the content object which may in turn trigger a notification event pertaining to the update. Interface 300c may also include a major edit check box to indicate that an update is a major edit and a notification should be sent pertaining to the major edit. In accordance with some embodiments, notifications may only be sent for major edits, and not minor edits.

At 204, notification system 50 is operable to gate a notification relating to the content object until the content object is published by monitoring the scheduled publication state. Further, notification system 50 is operable to gate the notification until the content object is published by monitoring the publication state. In addition, notification system 50 is operable to gate the notification until the content object is no longer in draft by monitoring the draft state. For example, notification system 50 may gate a notification by not raising a notification event until all conditions relating to the content object are met (e.g., publication conditions, availability conditions). As another example, a notification event for the content object may be raised but a component of notification system 50 may hold off passing the notification event to other components until a set of notification events for the content object have been collected or by checking conditions and publication states for the content object. For example, events service 60, event handler 62 or instant notification may gate notification events until all required conditions are met, the content object is in the correct state (e.g., published), or until a set of notification events for the same content object has been collected.

At 206, notification system 50 is operable to send the notification relating to the content object to one or more users 12, 14 when the content object is published. Prior to sending the notification to a user, notification system 50 is operable to check the notification status and not send the notification if the notification status indicates that a notification for the content object has been already sent to that user. As described herein, notification events may be propagated through components of notification system 50 and notification messages may be generated and delivered to user 12, 14 by a component of notification system 50.

Accordingly, notification system 50 is operable to check content object states to see if the content object becomes available to a user 12, 14 or is published. An event dispatcher component may trigger an event describing the updated availability to trigger the generation and delivery of a notification for a content object to a user. An event handler may route the raised event to the appropriate component of notification system 50.

Scheduling of publication may be convenient for users 14, 12 such as teachers or instructors of a course provided by education provider system 30. For example, a teacher or organization may upload all content objects for a course to education provider system 30 (e.g., database 52) at the start of a teaching period for the course. The user 14, 12 may then schedule publication dates for each content object in advance in line with the teaching agenda so that the user 12, 14 does not have to manually trigger the publication of each content object, and does not have to make all content objects for the course available to users 12 (e.g., learners) at the time of upload.

As noted herein, a content object may have a draft state which may facilitate review of the content object by other users prior to publication. For example, a user 12, 14 may create content for a course (e.g., a teaching assistant or learner) and may have another user 12, 14 (e.g., an instructor or another learner that may be partnered with the first learner) review the material prior to publication, and save the content object as a draft which sets the corresponding state. For example, the content object may relate to a group project and all members of the groups may be required to review and approve of the content object prior to publication. Notifications may be gated until the content object is no longer in draft state.

The scope of the claims should not be limited by the described embodiments and examples but should be given the broadest interpretation consistent with the description as a whole.

The invention claimed is:

1. A computer implemented method of gating notification relating to a content object of an electronic learning platform, wherein the computer comprises a processor and a memory coupled to the processor and configured to store instructions executable by the processor to perform the method comprising:
   a) determining whether the content object is available to at least one user, wherein the content object is initially hidden from the at least one user and becomes available to the at least one user in response to an action by the at least one user;
   b) upon determining that the content object is available to the at least one user, sending a notification to the at least one user indicating that the content object is available; and
   c) upon determining that the content object is not available to the at least one user, gating the notification until the content object is available to the at least one user.

2. The method of claim 1, wherein the determining as to whether the content object is available comprises determining a publication date of the content object, wherein the content object may only be available to the at least one user on or after the publication date.

3. The method of claim 1, further comprising scheduling the content to be automatically published at a publication date, and wherein the determining as to whether the content object is available comprises determining whether the publication date of the content object has occurred, wherein the content object may only be available to the at least one user if the publication date has occurred.

4. The method of claim 1, further comprising maintaining a publication state for the object indicating if the object has been published, and wherein the determining as to whether the content is available comprises checking the publication state to determine whether the object has been published.

5. The method of claim 1, further comprising maintaining a scheduled publication state for the content object, wherein the scheduled publication state indicates a publication date of when the content object will be automatically published, and wherein the determining as to whether the content is available comprises checking the scheduled publication state to determine whether the publication date has occurred.

6. The method of claim 1, further comprising maintaining a draft state indicating if the content object is a draft, wherein if the content object is the draft, then the content object may not available to one or more users, and wherein the determining whether the content is available comprises checking the draft state to determine whether the content object is the draft.

7. The method of claim 1, wherein the content object is associated with at least one permission attribute, and wherein the determining as to whether the content object is available to the at least one user comprises checking the permission attribute.

8. The method of claim 1, wherein the determining as to whether the content object is available to the at least one user comprises checking release conditions based on one or more actions performed by the at least one user.

9. The method of claim 1, wherein the determining as to whether the content object is available to the at least one user comprises determining whether an event has occurred, wherein the event is associated with at least one of the at least one user and the content object.

10. The method of claim 1, wherein the determining as to whether the content object is available to the at least one user comprises checking configurations associated with the at least one user.

11. The method of claim 1, further comprising maintaining a notification status indicating if a notification has been sent to the at least one user for the content object, and wherein prior to the sending the notification to the at least one user the method further comprises checking the notification status and not sending the notification if the notification status indicates that a notification has been sent to the at least one user for the content object.

12. The method of claim 11, further comprising maintaining a notification status on a per user basis, wherein each notification status is associated with a user indicating if a notification has been sent to the user for the content object.

13. A computer implemented method of gating notification relating to a content object of an electronic learning platform, wherein the computer comprises a processor and a memory coupled to the processor and configured to store instructions executable by the processor to perform the method comprising:
   a) maintaining a scheduled publication state for the content object, wherein the scheduled publication state indicates a publication date of when the content object will be automatically published, wherein the content object is initially hidden from at least one user and becomes available to the at least one user in response to an action by the at least one user;
   b) gating a notification relating to the content object until the content object is published by monitoring the scheduled publication state; and
   c) sending the notification relating to the content object to the at least one user when the content object is published and available to the at least one user.

14. The method of claim 13, further comprising maintaining a publication state for the content object indicating whether the content object has been published, wherein the gating of the notification further comprises monitoring the publication state.

15. The method of claim 13, further comprising maintaining a draft state for the content object indicating whether the content object is a draft, wherein if the content object is a draft, then the notification relating to the content object may be gated for one or more users, and wherein the gating of the notification further comprises monitoring the draft state.

16. The method of claim 13, further comprising setting, using an interface, the scheduled publication state for the content object by receiving the publication date.

17. The method of claim 13, further comprising maintaining a notification status indicating whether a notification has been sent to the at least one user for the content object, and wherein prior to sending the notification to the at least one user the method further comprises checking the notification status and not sending the notification if the notification status indicates that a notification has been sent to the at least one user for the content object.

18. The method of claim 17, further comprising maintaining a notification status on a per user basis, wherein each notification status is associated with a user indicating if a notification has been sent to the user for the content object.

19. A system of gating notification relating to a content object of an electronic learning platform comprising one or more processors and memory configured to provide:

a) at least one content object associated with a scheduled publication state, wherein the scheduled publication state indicates a publication date of when the content object will be automatically published, wherein the content object is operable to issue an availability event when the publication date occurs, and wherein the content object is initially hidden from at least one user and becomes available to the at least one user in response to an action by the at least one user;

b) an event handler operable to monitor for publication events and generate a notification event for the content object upon detecting an availability event issued by the content object; and c) a notification handler operable to monitor for notification events and to gate a notification relating to the content object to the at least one user until detecting a notification event for the content object.

20. The system of claim 19, further comprising an interface for setting the scheduled publication state for the content object.

\* \* \* \* \*